Jan. 14, 1936.    A. R. HAND    2,027,864

PHASE SEQUENCE INDICATOR

Filed Oct. 25, 1934    2 Sheets-Sheet 1

Inventor:
Arthur R. Hand,
by Harry E. Dunham
His Attorney.

Jan. 14, 1936.　　　　A. R. HAND　　　　2,027,864

PHASE SEQUENCE INDICATOR

Filed Oct. 25, 1934　　　　2 Sheets-Sheet 2

Inventor:
Arthur R. Hand, by Harry E. Dunham
His Attorney.

Patented Jan. 14, 1936

2,027,864

UNITED STATES PATENT OFFICE 2,027,864

PHASE-SEQUENCE INDICATOR

Arthur R. Hand, Schenectady, N. Y., assignor to General Electric Company, a corporation of New York Application October 25, 1934, Serial No. 749,959

5 Claims. (Cl. 172—245)

My invention relates to electrical indicating apparatus and concerns particularly devices responsive to phase rotation or phase sequence and methods of determining the phase sequence of polyphase alternating-current electrical circuits.

It is an object of my invention to provide a simple, rugged, durable, relatively inexpensive device for indicating phase sequence which is compact and light in weight.

Another object of my invention is to provide a phase-sequence indicator which may be used without adjustment for a wide range of voltages and frequencies.

Another object of my invention is to provide a phase-sequence indicator without moving parts and without parts tending to wear out or be consumed so as to require periodic replacement.

Still another object of my invention is to produce a device giving positive and direct unmistakable indications.

Another object is to provide a simple and direct method of determining phase sequence in testing watt-hour meters and reactive volt-ampere meters, for determining the phase rotation of polyphase machines, for determining transformer connections, and for determining phase relation while synchronizing polyphase machinery.

Other and further objects and advantages will become apparent as the description proceeds.

In carrying out my invention in its preferred form, I provide a pair of glow discharge tubes, for example, neon tubes, and a condenser and connect the three elements in Y. In using the device, the three Y terminals are connected to the three lines of a three-phase circuit or to three of the lines of a polyphase circuit and the direction of the phase rotation is indicated by which of the two lamps becomes luminous.

Figure 1:
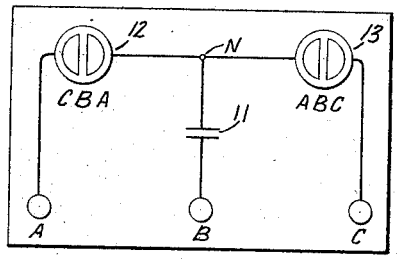
Figure 2:
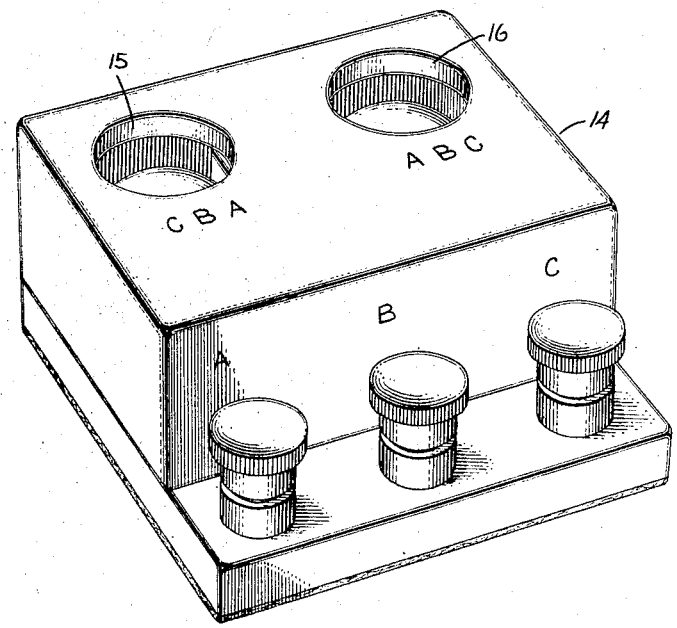
Figure 3:
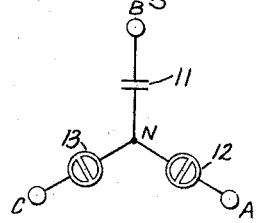
Figure 4:
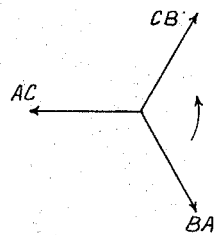
Figure 5:
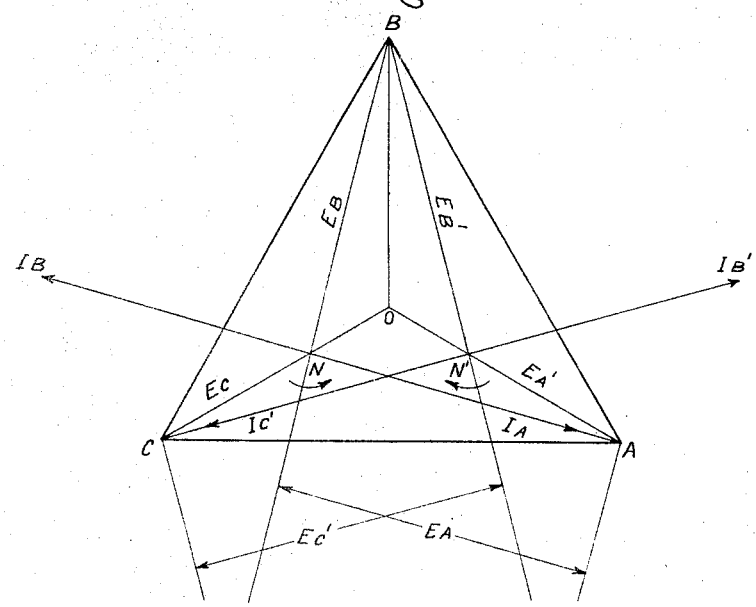
Figure 6:
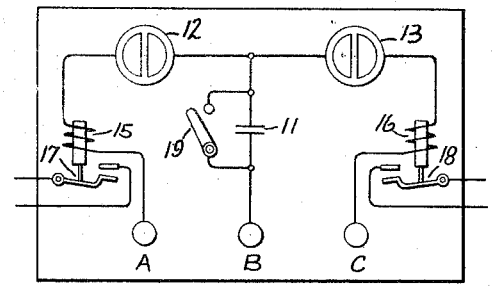

The features of my invention which I believe to be novel and patentable will be pointed out in the claims appended hereto. A better understanding of my invention itself may be obtained by referring to the following description taken in connection with the accompanying drawings, in which Fig. 1 is a schematic circuit diagram illustrating one embodiment of my invention; Fig. 2 is a perspective view of a commercial form of the apparatus of Fig. 1; Fig. 3 is a diagram representing schematically the phase positions of the elements of the apparatus; Figs. 4 and 5 are vector diagrams explaining the theory of operation of the apparatus; and Fig. 6 is a schematic diagram of another embodiment of my invention.

Referring now more in detail to the drawings in which like reference characters are used to designate like parts throughout, I have shown in Fig. 1 an embodiment of my invention to be used for indicating purposes only. This form of the apparatus comprises a condenser 11, and lamps 12 and 13, which are preferably of the glow discharge type, for example, neon filled discharge tubes, for reasons which I will later explain. One terminal of each of the elements 11, 12 and 13 is connected to a common point N and leads from the remaining terminals are brought out to binding posts marked A, B, and C. The elements are thus connected in Y or, as it is sometimes called, "in star".

The elements 11, 12, and 13 are enclosed in a casing 14 shown in Fig. 2 having two openings 15 and 16 registering with the lamps 12 and 13, respectively. The binding posts A, B, and C are provided for connection to the conductors of a polyphase alternating-current electrical circuit when determining the phase sequence thereof. One of the openings, 15, is provided with the caption "CBA" and the other opening 16 is provided with the caption "ABC" representing the opposite phase sequence, the order of the letters indicating the order in which the alternating voltages reach their maximum or peak values. It is, of course, immaterial whether letters, numbers, or some other form of indicia are employed provided the marking system is consistent. If the letters shown are employed, the caption "CBA" is applied to the lamp 12, the free terminal of which is given the letter A, and the caption "ABC" is applied to the lamp 13, the free terminal of which is given the letter C, the remaining letter B, of course, being applied to the terminal brought out from the condenser 11. The reasons why the lamps represent the phase sequences shown will be apparent from a consideration of the manner in which the device operates.

For convenience in explaining the theory of operation, the circuit diagram of Fig. 1 may be redrawn as shown in Fig. 3 showing the three conductors A, B, and C of a polyphase circuit physically spaced at the corners of an equilateral triangle to represent the phase displacements of the line voltages. A vector diagram representing the line voltages is shown in Fig. 4 in which the vector BA represents the voltage between terminals B and A, the vector CB the voltage between terminals C and B, and the vector AC the voltage between terminals A and C.

In order that a clear understanding of the operation of my apparatus may be obtained, I shall first explain what is meant by phase sequences CBA and ABC. Since in a three-phase or polyphase circuit, there usually is either no actual neutral or the neutral is not brought out to the point at which the determination of phase sequence is to be made, the description of phase sequence must be assumed to be with reference to the line voltages. The phase sequence CBA, therefore, would signify that the line voltage CB reaches its maximum at a given instant, that then a third of a cycle later, the line voltage BA reaches its maximum, followed in turn by the line voltage AC, then the line voltage CB again and so on.

In using the vector notation to symbolize sinusoidally varying quantities like alternating current or voltage, the quantities are thought of as vectors rotating at a uniform speed. But, for graphic illustration, the rotating vectors are assumed to be frozen in stationary positions at some arbitrary instant of time to produce a vector diagram. Symbolized in this way, the line voltage BA may be said to lag 120 electrical degrees behind the line voltage CB; AC may be said to lag 120 electrical degrees behind BA; etc. In order for voltages BA and AC to lag behind voltage CB in the vector diagram of Fig. 4, the counterclockwise rotation of the revolving vectors must be assumed. The arrow placed on the diagram (Fig. 4) represents, therefore, the direction of rotation of the vectors for the phase sequence CBA. The phase sequence ABC will, of course, signify the opposite phase rotation or sequence.

In explaining the operation of my device, I shall first assume that my device is connected to a polyphase circuit having the phase sequence CBA. The line voltages may be represented as shown in Fig. 4. The phase voltages, that is, the voltages in Y-connected elements 11, 12, and 13, may best be represented in a diagram, such as Fig. 5, which is enclosed by equilateral triangle ABC, the sides of which represent the vectors shown in Fig. 4. The voltages across elements 11, 12, and 13 may be represented, as is well understood in the art, by vectors radiating from a common point and terminating in the three points A, B, and C, since the voltage relationships at the terminals A, B, and C are fixed by the line voltages existing in the alternating-current circuit. For convenience, it is assumed that the voltages of the circuit are balanced, which is substantially true in practice, so that the voltages are accurately represented by the sides of the equilateral triangle ABC.

The exact position of a point, such as the point N, representing the potential at the common or neutral point of the three phases of my indicator formed by the elements 11, 12, and 13 depends, however, on the magnitude of the impedances of the three phases as well as the phase relationships between current and voltage in the three phases. In the case of a balanced load, such as three resistances connected in Y, the phase voltages would, of course, be represented by three vectors, such as the vectors OA, OB, and OC, equally spaced at 120 degrees and radiating from a point, such as the point O, at the center of the triangle ABC. In my device, the phases A and C may be regarded as resistances since, whether neon tubes or incandescent lamps are employed, the power factor is substantially unity.

In the phase B, however, formed by the condenser 11 of suitably chosen capacitance, the phase current $I_B$ will lead substantially 90 degrees in advance of the phase voltage $E_B$ and the phase voltage $E_B$ will therefore tend to lag angularly behind the position OB which would be taken by the phase voltage in a hypothetical balanced Y load. Since a phase sequence CBA was assumed for this part of the explanation and, as explained in connection with Fig. 4, this is represented by a counterclockwise rotation of the vectors, the phase voltage $E_B$ in lagging will tend to assume a position angularly displaced in a clockwise direction from that of the hypothetical OB. Accordingly, since the vector OB representing the phase voltage in a hypothetical balanced load and the voltage vector $E_B$ representing the phase voltage in my device both terminate at the point B, the neutral point N representing the origin of the vector $E_B$ will necessarily be moved to the left. As the neutral point N is forced to the left, the phase voltage NA or $E_A$ across lamp 12 is increased and the phase voltage NC or $E_C$ across lamp 13 is decreased.

In neon tubes, such as I use for my lamps 12 and 13, the discharge space breaks down and the current begins to flow only above a predetermined voltage. I make use of these characteristics and so select the design of the tubes that the tube 13 in phase C subjected to the decreased voltage fails to ignite and remains dark and the tube 12 in phase A subjected to increased voltage ignites and carries a current, becoming illuminated and providing a light signal adjacent the caption "CBA" to indicate that the phase sequence is in that order. The transient conditions, as one of the lamps becomes illuminated, cannot readily be represented diagrammatically but, in Fig. 5, I have shown the vector relationships representing conditions after current in lamp 12 has been established.

It is apparent that the current $I_B$ in the condenser, phase B, leads phase voltage $E_B$ by substantially 90 degrees. It is also apparent that the current $I_A$ in lamp A necessarily is equal in scalar value and exactly opposite in sense to current $I_B$ since the sum of the currents at the point N must equal zero, and no current was established in lamp 13. As the lamp 12 acts as a resistance load, the vector NA representing the voltage across the lamp 12 must be along the vector $I_A$ representing the current in the lamp 12. The vector $E_B$ representing the voltage across the condenser 11 being substantially perpendicular to $I_B$ and $I_A$ must be substantially perpendicular to the voltage NA, thus accounting for the fact that the neutral point N must lie to the left of the center O of the triangle ABC. From the geometry of Fig. 5, it is apparent that the length of the vector NA is $$1/\sqrt{2}$$

times the line voltage BA. Also, the length of the vector NC is the difference between the altitudes of the triangles BNA and BCA, which difference equals $$\left(\frac{\sqrt{3}-1}{2}\right)BA$$

In order to cause the device to operate with one lamp bright and the other dark, lamps are chosen with a critical or minimum operating or ignition voltage greater than a value corresponding to the length of the vector NC or greater than $$\left(\frac{\sqrt{3}-1}{2}\right)$$

times the line voltage. It is not necessary, however, that the ignition voltage be less than the length of the vector NA or $$1/\sqrt{2}$$

times the line voltage for the reason that, as previously explained, the vector diagram represents only conditions after discharge current is established and cannot represent the transient condition before discharge current has begun to flow, when there is substantially no voltage drop in the condenser 11 (making vector NB very small) and substantially full line voltage is available for igniting the proper tube.

If incandescent lamps were employed at 12 and 13, current of a reduced value would, of course, flow in phase C and the vector diagram would be modified somewhat. However, it is apparent that the neutral point N would still lie on the left-hand side of the triangle ABC and that the voltage and current in lamp 13, phase C, would be less than that in lamp 12, phase A, so that an indication of phase sequence would be obtained by the difference in brightness of the two lamps. I prefer, however, to use glow lamps, such as neon discharge tubes, since in this manner a positive and direct indication is obtained with one lamp bright and the other one dark.

Let it be assumed now that the device is connected to a polyphase circuit in which the phase sequence is in the order ABC. As a vector used as the symbol of a current or voltage in a polyphase alternating-current circuit must now rotate in the clockwise instead of the counterclockwise direction, the neutral point of the phases of my device must now assume a new position, N', since, in order to lag behind the current with respect to the clockwise direction of rotation, the phase voltage E'B in condenser 11 must now point obliquely to the left instead of to the right.

The other vectors representing conditions with the phase sequence in the order of ABC will correspond to those already described except that they will assume positions symmetrical thereto with respect to the vertical centerline of the triangle ABC. The vectors representing the condition for the phase sequence ABC are represented by primed letters in Fig. 5.

Although my device is of great value in producing a positive indication of phase sequence, the invention is not limited thereto but obviously also includes other phase-sequence responsive devices such as phase-sequence relays and the like. For example, as shown in Fig. 6, relays 15 and 16 may be connected in series with lamps 12 and 13, respectively, so that relay 15 will pick up its contacts 17 when current flows through the lamp 12 and the phase sequence is in the order CBA but will drop its contacts when the phase sequence is in the reverse order, and similarly the relay 16 will pick up its contacts 18 when the phase sequence is in the order ABC and current flows in lamp 13 but will drop its contacts when the phase sequence is in the reverse order. Preferably, relays 15 and 16 are selected having a relatively low inductance with respect to the equivalent resistance of lamps 12 and 13. However, this is not absolutely essential since the tendency of the voltage across condenser B to lag behind the current therein will still tend to force the neutral point to the left or to the right, depending upon the phase sequence as explained in the foregoing.

Although I prefer to utilize a condenser 11 as the phase-displacing element, since a condenser is the lightest and most compact form of impedance comparable in scalar value to the equivalent resistance of low power neon tubes that may be produced to have a large phase angle between the current and voltage therein, i. e., a low power factor, it will be understood that I am not limited to the use of a condenser. It will be apparent that an inductive impedance might be substituted for the condenser 11 but that, in this case, the phase relationship between current and voltage in phase B would be reversed and the neutral point N would be shifted in the opposite direction to that described in connection with Fig. 5. If an inductive impedance were employed at 11, of course the positions of the captions "CBA" and "ABC" would be reversed.

Although I am not limited to the specifications I shall now mention, I have found that a satisfactory device of great compactness and very light weight for a normal range of operation on 90-to-150-volt circuits may be produced by employing ½ watt 120 volt neon glow tubes as lamps 12 and 13 and a 0.1 microfarad telephone type condenser at 11 consisting of alternate layers of metal foil and paper as is well known in the art. At 60 cycles, the impedances of the three legs of the Y formed by the elements 11, 12, and 13 are then very nearly the same and, at 25 cycles, the impedances are still comparable so that, although the relative lengths of some of the vectors in Fig. 5 may be modified, the qualitative result is unchanged regardless of variations in frequency within the usual commercial range. Likewise, voltage fluctuations of much greater magnitude than ever encountered in ordinary alternating-current circuits are insufficient to prevent the lamps 12 and 13 from operating as described.

Furthermore, since the lamps 12 and 13 have no filaments to burn out, even very serious overvoltages cannot injure the apparatus and there is no need to replace lamps 12 and 13 owing to burning out of filaments even after very long use. However, if desired, a switch 19 may be provided for momentarily short-circuiting the condenser 11 and connecting both lamps 12 and 13 in circuit in order to make sure that both lamps are in good operating condition before a test is made.

In utilizing my device to determine the phase sequence of three-phase circuits, the terminals A, B, and C are, of course, connected to the three conductors of the circuit and, in measuring the phase sequence of polyphase circuits having a number of phases other than three, the terminals A, B, and C are connected to three of the conductors of the circuit to obtain the phase order of the voltages between these three conductors. Ordinarily, this determination will give the direction of phase rotation of the polyphase circuit. However, if necessary, the terminals A, B, and C may be connected to successive groups of three conductors progressively for the purpose of determining the phase sequence of the voltage between any two conductors with respect to the voltage between any other two conductors until the relative phase sequences of all line voltages in the polyphase circuit have been determined.

What I claim as new and desire to secure by Letters Patent of the United States is:

1. A phase-sequence indicator for a polyphase system comprising in combination, a pair of neon discharge tubes and a condenser connected in Y, said tubes having a critical voltage greater than $$\left(\frac{\sqrt{3}-1}{2}\right)$$

times the line voltage of the system.

2. A phase-sequence indicator for a polyphase system comprising in combination, a pair of glow discharge tubes and a low power-factor impedance connected in Y, said tubes having a critical voltage greater than $$\left(\frac{\sqrt{3}-1}{2}\right)$$

times the line voltage of the system.

3. A phase-sequence indicator for a polyphase system comprising in combination, a pair of glow discharge tubes and a low power-factor impedance connected in Y, a casing enclosing said elements having openings therein, each registering with one of said glow discharge tubes to permit light therefrom to become visible when illuminated, terminals connected to the free ends of said Y-connected elements and having identifying indicia and identifying means adjacent each of said light-ejecting openings representing opposite phase sequences in terms of said indicia, said tubes having a critical voltage greater than $$\left(\frac{\sqrt{3}-1}{2}\right)$$

times the line voltage of the system.

4. A phase-sequence responsive device for a polyphase system comprising in combination, a pair of glow discharge tubes and a low power-factor impedance connected in Y, and a current-responsive device connected in series with one of said discharge tubes, said tubes having a critical voltage greater than $$\left(\frac{\sqrt{3}-1}{2}\right)$$

times the line voltage of the system.

5. A phase-sequence indicator for a polyphase system comprising in combination, a pair of glow discharge tubes and a low power factor impedance connected in Y, said tubes having a critical voltage lying between $$\left(\frac{\sqrt{3}-1}{2}\right)$$

times the line voltage of the system and a value substantially equal to said line voltage.

ARTHUR R. HAND.